Aug. 5, 1958     L. W. YOUNGSTROM ET AL     2,845,632
WATER-CLOSET COMBINATION
Filed Nov. 8, 1952
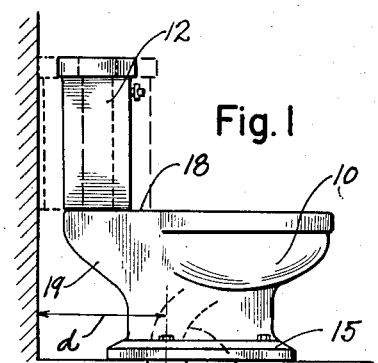
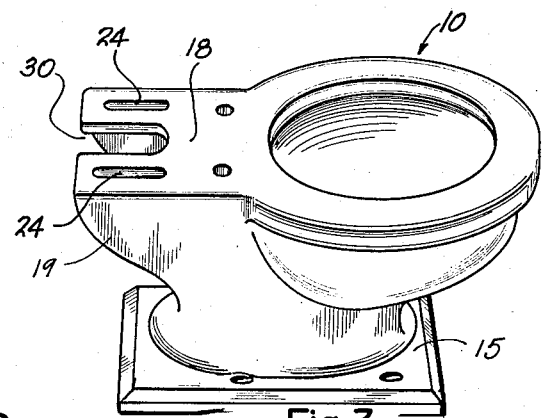
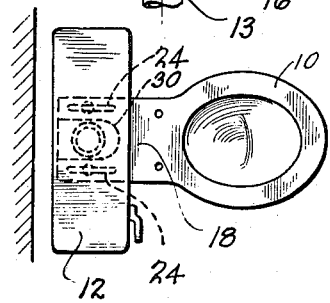
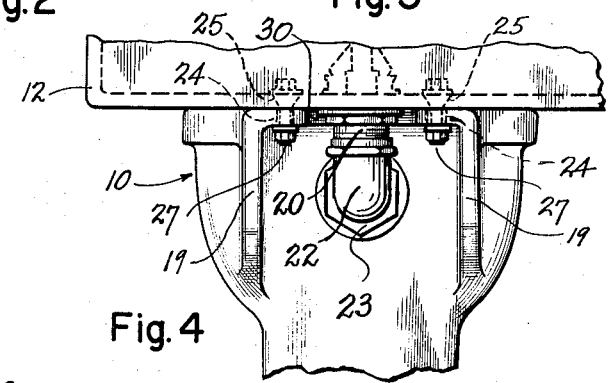
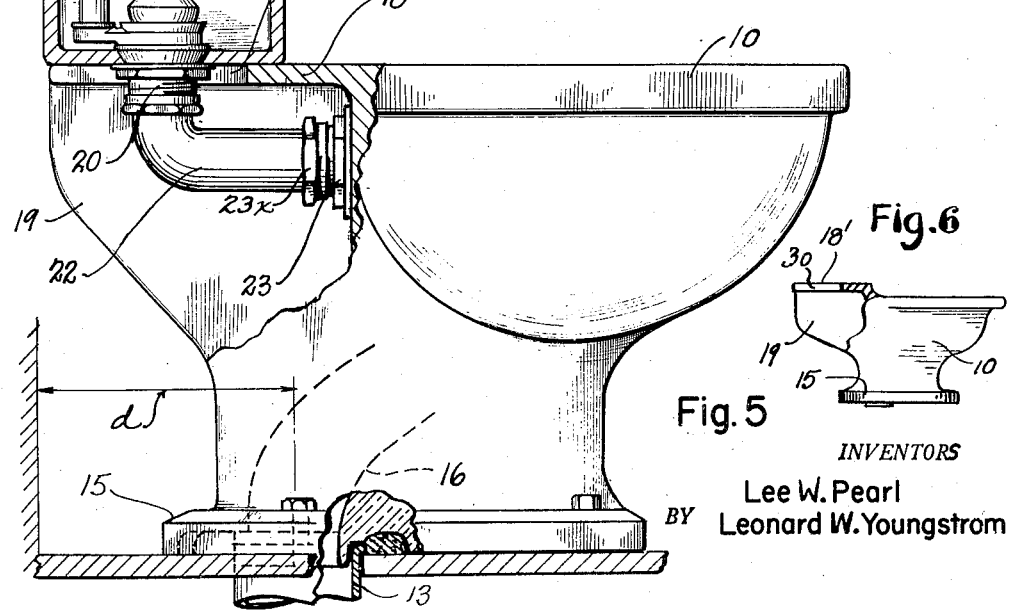
INVENTORS
Lee W. Pearl
BY Leonard W. Youngstrom

United States Patent Office

2,845,632
Patented Aug. 5, 1958

2,845,632

WATER-CLOSET COMBINATION

Leonard W. Youngstrom and Lee W. Pearl, Seattle, Wash.

Application November 8, 1952, Serial No. 319,494

3 Claims. (Cl. 4—14)

This invention relates to improvements in water-closet combinations; that is, to combinations comprising a bowl and water tank. More particularly, the invention has reference to improvements in details of construction of the bowl portion to accommodate a close coupled bowl and tank combination to a substantial range of adjustment, thus to adapt it to different "rough in" distances which the closet may be required to meet for proper installation.

For a better understanding of the present invention, it will here be explained that present day types of close coupled water-closet combinations are designed for definite "rough in" distances. Generally the distance is twelve inches, however, it is quite common in the installing of such water closets in new buildings, or in replacing old types of closets with present day close coupled combinations, to find the "rough in" distance to be more or less than that for which the fixture to be installed is designed. Consequently when the close coupled combination is properly set in place on the waste pipe, the water tank may be found to be a substantial distance from the wall, which is an undesirable condition, or it may even be impossible to properly place the bowl over the waste pipe inlet by reason of an insufficient "rough in" distance. The fact that "rough in" distances are not always the same, and may vary anywhere within a range of from ten to fourteen inches, has resulted in much annoyance to persons making water-closet installations; it has caused added expense in making proper adjustments to accommodate bowls that are designed for a certain standardized "rough in" distance to the distance that actually exists, and it has resulted in loss of sales by dealers, especially those handling the close-coupled combination, when it is learned by the prospective purchaser that the "rough in" distance for which the fixture is designed is more or less than that which must be accommodated.

In view of the above explanation, it has been the principal object of this invention to provide a tank and bowl combination with an adjustment in their coupled relationship that will accommodate the fixture to a substantial range of "rough in" distances; thus to provide that the tank can be located in the intended and proper relationship to the wall without interference in making the proper connection between the bowl and floor drain.

It is a further object of the present invention to provide improvements in the design of the bowl ledge on which the water tank of the close coupled combination is set, that will give additional strength for mounting the tank and also will effectively and without detracting from the appearance of the fixture, conceal those pipe connections known as the spud, flush elbow, the tank anchor bolts, and all related connections.

Still another object of the present invention is to provide improvements in the bowl ledge construction that will afford greater convenience for the tank installing or attaching operations, and will enhance the appearance of the fixture by housing therein those pipe connections that are not generally considered to be ornamental.

In accomplishing the above mentioned and other objects of the present invention, we have provided the improved details of construction, the preferred forms of which are illustrated in the accompanying drawings, wherein—

Fig. 1 is a side view of a water-closet bowl and tank combination embodying the improvements of the present invention therein, and indicating a variable adjustment of the tank on the bowl ledge.

Fig. 2 is a top, or plan view of the same, showing a space between wall and tank that can be decreased or eliminated if desired by the variable adjustment of the tank.

Fig. 3 is a perspective view of the bowl showing the improved construction of the ledge and the provision made for the adjustable securement of the tank thereon.

Fig. 4 is a rear elevation of a part of the bowl and water tank, showing the tank attaching bolts as applied to the ledge.

Fig. 5 is a side view of a bowl and tank as mounted thereon; showing the spud and flush elbow as contained within the slot of the bowl ledge.

Fig. 6 is a side view of a bowl having an elevated ledge to accommodate flush elbows with greater radius on inner turn.

Referring more in detail to the drawings—

The present water-closet combination comprises the bowl which is designated in its entirety by reference character 10, and the water tank which is designated in its entirety by reference numeral 12. For the purpose of better understanding of the objects of the present improvements, the "rough in" distance herein referred to is defined as the distance from the adjacent vertical wall to the center line of the waste pipe 13, and is this distance represented in Fig. 1 by the length of the double headed arrow $d$. These various "rough in" distances can be accommodated in accordance with the provision made in the improved construction of this close coupled adjustable combination by adjusting the tank on the bowl shelf accordingly.

It is shown best in Fig. 3 that the bowl 10 is equipped with the usual base flange 15 by which it can be fixed to a floor with its outlet, indicated at 16 in Figs. 1 and 5, registered in a water tight joint with the upper end, or inlet end of the waste pipe 13. Cast integrally with the bowl is a rearwardly extending, horizontal ledge or shelf 18 of substantial rearward extent, upon which the tank 12 is supported and secured. The top of the shelf and the top of the bowl are shown in Figs. 1 to 5 to be at the same level. However, it may be desired and practical to have the shelf at a higher level than the top of the bowl, as the shelf 18' has been shown in Fig. 6, in order to give more clearance beneath it for the accommodation of certain types of pipe connections extended between tank and bowl.

The ledge 18 is given adequate support by vertical webs 19—19 cast integral therewith and laterally spaced, as seen in Fig. 4, and providing adequate space between them for containing the pipe connections that lead from the tank to the bowl. These connections as seen in Figs. 4 and 5, comprise the usual flush valve fitting 20 that passes downwardly through an outlet provided therefor in the bottom wall of the tank and through the bowl slot 30 and the elbow pipe 22 that leads from the flush valve to the bowl inlet spud 23 in which it is secured by the slip nut 23x. The inlet spud 23 opens into the bowl through its rear wall, between the webs 19—19 and a few inches below the level of the shelf 18 as seen in Fig 4.

In order that the tank may be secured by the usual means and in the usual manner, the ledge 18 is provided at opposite sides of its longitudinal center line and parallel therewith, with elongated slots 24—24, with which the tank bolt holes 25—25 in the bottom wall of the tank can be registered to receive the usual anchor bolts 27—27 therethrough as has been shown in Fig. 4. By reason of the provision of the slots 24—24 and a flush valve slot 30 in the closet ledge, the tank can be adjusted forwardly or rearwardly to the extent permitted by the length of the slots, which can be four or more inches, as desired, and can then be secured in place at the desired position by tightening the nuts on the anchor bolts 27—27 against the under side of the ledge.

In order that the tank may be placed in position with flush valve and elbow fixed therein, the ledge 18 is provided, in its central longitudinal plane, with an elongated rearwardly opening recess or slot 30, of sufficient width to receive the flush valve fitting and its securing nut therein, as has been shown in Figs. 3, 4 and 5. The slot 30, as shown, extends to such length into the ledge that a forward or rearward adjustment of the tank of at least four inches can be made. Thus, a bowl that is designed for a minimum "rough in" distance of ten inches can easily and readily accommodate its tank to a "rough in" distance of anywhere up to fourteen inches.

With the bowl and tank so designed, it is the usual procedure to first measure the "rough in" distance, and then place the tank on the ledge, adjust tank to proper distance, then fit flush elbow to this adjustment and secure in place by anchor bolts. Thus, by reason of the provision for adjustment, proper spacing of the water tank relative to the wall can be made at all "rough in" distances that the design of their adjustable "rough in" close coupled combination allows for.

This particular construction of the ledge provides that the connections between tank and bowl will be enclosed, thus producing an eye appealing, adjustable "rough" close coupled combination utilizing the flush elbow connection of the wall suspended tank. These connections, in conjunction with the particular design of the closet bowl ledge are the means that provide for an adjustment of substantial extent to accommodate various "rough in" distances.

Having thus described our invention, what we claim as new therein, and desire to secure by Letters Patent, is:

1. A close coupled water closet combination comprising a bowl formed across the rear end thereof with an integral, horizontal ledge at the level of its top edge portion for the functional support of a close coupled water tank thereon, webs formed integral with the bowl and extending rearwardly and integrally joined with the ledge along its opposite side edges, providing therewith a rearwardly opening housing, said bowl having a substantially vertical rear wall surface below the ledge and there being an inlet formed through said vertical wall surface and opening into the bowl; said ledge having a slot formed therein medially of the webs that opens to the rear edge of the shelf and extends from said edge a substantial distance forwardly thereof, and there being paired elongated slots formed through the shelf between the webs, at apposite sides of the first mentioned slot, and parallel thereto, and a water tank disposed upon the shelf for its functional support, and adapted for forward and rearward adjustment thereon to accommodate it to various rough in distances, a flush valve fitting applied to the bototm wall of the tank and extended into the first mentioned slot, and movable therealong in the assembling of the tank and bowl and in the making of any forward or rearward adjustments of the tank on the shelf, an inlet spud applied to the inlet as provided in the rear wall of the bowl, an elbow pipe attached at one end of the flush valve fitting of the tank and having its other end adjustably applied to the inlet spud of the bowl and therein secured by means effecting a water tight connection, and tank securing bolts fixed in the bottom wall of the tank and extended downwardly therefrom through said paired parallel slots, and nuts applied to the lower ends of said bolts and adapted to be tightened against the underside of the shelf for functionally securing the tank at a selected rough in setting; said spud, elbow pipe and nuts being enclosed within said housing but accessible through the open rear end thereof.

2. A flush tank and toilet bowl combination comprising a toilet bowl having a rearwardly directed horizontal shelf, a flush tank having its bottom wall resting upon said shelf, fastening means depending from said bottom wall, said shelf having an elongate slot therein through which said fastening means projects whereby the flush tank is adjustable forwardly and rearwardly on said shelf, said shelf also having an elongate notch therein extending forwardly from its rear edge and there being an opening in said bowl beneath said shelf, an L-shaped conduit communicating with said tank having its upstanding leg secured in depending relation from said bottom wall and projecting downwardly through the notch in said shelf, and said member having its horizontal leg projecting forwardly through the opening in said bowl, and means securing said horizontal leg to the bowl to permit longitudinal shifting of such leg relative thereto.

3. A toilet bowl and flush tank assembly comprising a toilet bowl having a substantially vertical rear wall provided with an opening extending horizontally therethrough, a horizontal shelf extending rearwardly from the top edge of said rear wall, and vertical side walls depending from opposite side edges of said shelf and joined integrally with the bowl structure, said shelf having an elongate notch extending forwardly from its rear edge and having a pair of elongate slots extending parallely to the notch, the notch being disposed midway between said side walls and said slots being equidistantly spaced on opposite sides of the notch, a flush tank having a bottom wall seated directly upon said shelf, fastening elements depending from said bottom wall and projecting through the slots in said shelf whereby the tank may be adjustably positioned, fore and aft, on the shelf, and an L-shaped conduit connecting the tank and bowl, said conduit having a vertical leg depending from the bottom wall of the tank through said notch and having a forwardly extending horizontal leg projecting through said opening in the rear wall of the tank to permit the aforementioned fore and aft adjustment of the tank on the shelf.

References Cited in the file of this patent

UNITED STATES PATENTS

| 624,569 | Stover | May 9, 1899 |
| 968,411 | Quinn | Aug. 23, 1910 |
| 1,679,669 | Kennedy | Aug. 7, 1928 |
| 1,867,118 | Tilden | July 12, 1932 |
| 1,963,709 | McManama | June 19, 1934 |
| 2,240,130 | Carothers | Apr. 29, 1941 |

FOREIGN PATENTS

| 737,463 | France | Oct. 3, 1932 |